(12) United States Patent
Kobayashi (10) Patent No.: US 6,802,240 B2
(45) Date of Patent: Oct. 12, 2004

(54) BOOSTER

(75) Inventor: Kazuo Kobayashi, Saitama-Ken (JP)

(73) Assignee: Bosch Automotive Systems Corporation, Tokyo (JP)

( * ) Notice: Subject to any disclaimer, the term of this patent is extended or adjusted under 35 U.S.C. 154(b) by 18 days.

(21) Appl. No.: 10/228,449

(22) Filed: Aug. 27, 2002

(65) Prior Publication Data

US 2003/0056642 A1 Mar. 27, 2003

(30) Foreign Application Priority Data

Sep. 18, 2001 (JP) .................................. 2001-283941

(51) Int. Cl.[7] ................................................ F15B 9/10
(52) U.S. Cl. ................................... 91/369.2; 91/369.3
(58) Field of Search ............................. 91/369.2, 369.3

(56) References Cited

U.S. PATENT DOCUMENTS

| 4,719,842 A | * | 1/1988 | Gautier ..................... 91/369.2 |
| 4,813,338 A | * | 3/1989 | Mortimer et al. .......... 91/369.2 |
| 5,794,506 A | * | 8/1998 | Inoue et al. ............... 91/369.2 |
| 5,819,633 A | * | 10/1998 | Satoh ........................ 91/369.2 |
| 6,334,384 B1 | * | 1/2002 | Hoerner .................... 91/369.2 |

FOREIGN PATENT DOCUMENTS

JP  10-16757  1/1998

* cited by examiner

Primary Examiner—Edward K. Look
Assistant Examiner—Igor Kershteyn
(74) Attorney, Agent, or Firm—Flynn, Thiel, Boutell & Tanis, P.C.

(57) ABSTRACT

A base 36A of an output shaft 36 is made up of a rod member 36B, and a holder 43 having a bottom 43A. A stop 42 is formed separately from the holder. The holder has a reduced diameter portion 43B, in which an outer coiled spring 41A and an inner coiled spring 41B are disposed, and a piston 40 is disposed rearward thereof, and an increased diameter portion 43D in which the stop is disposed, and a reaction disc 35 is disposed rearward thereof.

4 Claims, 4 Drawing Sheets

BOOSTER

FIELD OF THE INVENTION

The present invention relates to a booster as may be used in a brake of an automobile, and more particularly, to a booster which allows an increased output to be obtained when a force of depression (input) applied to a brake pedal is equal to or greater than a given value.

DESCRIPTION OF THE PRIOR ART

A brake booster is known in the art comprising a valve body slidably disposed within a shell, a valve plunger slidably fitted over the valve body and mechanically coupled to an input shaft, an output shaft having a base which opens rearward and which is slidably mounted on the valve body, a reaction disc disposed between the base of the output shaft and the front end face of the valve plunger, a stop fixedly mounted in the base for abutment against the front end face of the reaction disc, an abutment member slidably disposed within the base for abutment against the front end face of the reaction disc, and an urging member for urging the abutment member rearward (see, for example, Japanese Laid-Open Patent Application No. 16,757/1998).

With this arrangement, when the force from the reaction disc which acts upon the abutment member increases above a load to which the urging member is charged to cause the abutment member to move forward, the volume defined within the reaction disc increases, permitting a more gentle rise in the internal pressure of the reaction disc, thus increasing a servo ratio of the booster. Accordingly, if a small servo ratio of the booster during the initial phase of a braking operation, which prevails before the abutment member begins to move, is chosen so that a favorable brake maneuverability is obtained, it is possible to achieve a greater servo ratio of the booster during a later phase of the braking operation after the abutment member has begun to move, thus allowing a braking effort of an increased magnitude to be obtained with a reduced force of depressing a brake pedal.

In the booster disclosed in said Application, the base of the output shaft comprises a bottom which extends radially outward and which is integrally formed with the rear end of an axially extending rod member, a rearwardly extending cylindrical member which is separate from the bottom, and a plurality of bolts connecting between the bottom and the cylindrical member. However, this assembly is disadvantageously expensive because of the cost of the bolts, the cost of machining threaded openings in the bottom to be threadably engaged by the bolts, and the cost of assembling while tightening the bolts.

In addition, in said Application, the urging member comprises either a coiled spring or a Belleville spring, which is used alone, affording a reduced flexibility in the choice of an input applied at a point where the servo ratio of the booster changes upon initiation of movement of the abutment member and of a range in which the servo ratio of the booster can be changed after the abutment movement has begun to move.

SUMMARY OF THE INVENTION

In view of the foregoing, it is an object of the present invention to provide a booster which allows both a machining cost and an assembling cost for the base of the output shaft to be reduced as compared with the prior art and which is capable of improving the flexibility in the choice of an input where the servo ratio of the booster changes and a range within which the servo ratio can be changed subsequently.

Specifically, according to a first aspect of the present invention, in a booster arranged in a similar manner as mentioned initially in connection with the conventional booster, the base of the output shaft comprises a holder which is separate from the axially extending rod member, the stop is separate from the holder, the holder is in the form of a bottomed cylinder having a bottom which is secured to the rod member, the stop is secured inside the cylinder, the abutment member and the urging member mentioned above are disposed between the stop and the bottom, and the urging member comprises either a plurality of coiled springs which are concentrically disposed or a single coiled wave spring.

According to a second aspect of the present invention, in the booster as mentioned above in connection with the first aspect of the present invention, the base of the output shaft comprises a bottom which is integrally formed with the axially extending rod member at the rear end thereof, and a cylindrical member which is separate from, but is connected to the bottom, the stop is formed integrally with the base, the stop is formed on the inner peripheral surface of the cylindrical member, the abutment member and the urging member are disposed between the stop and the bottom, and the urging member comprises either a plurality of coiled springs which are concentrically disposed or a single coiled wave spring.

According to a third aspect of the present invention, in the booster constructed in the manner as mentioned above, the base of the output shaft comprises a bottom formed integrally with an axially extending rod member at the rear end thereof, and a cylinder which is connected to the bottom, the stop is formed separately from the base, the stop comprises a body which is disposed for abutment against the front end face of the reaction disc, and a cylinder disposed for abutment against the bottom, the abutment member and the urging member are disposed between the body and the bottom, and the urging member comprises either a plurality of Belleville springs or a single diaphragm spring.

According to the arrangement defined by the first aspect of the present invention, the base of the output shaft comprises a holder including a cylindrical portion which is fixed within the rod member and in which the stop is secured. Accordingly, the machining cost can be reduced in comparison to a conventional arrangement in which the base comprises a bottom, a cylindrical member and bolts which connects therebetween while simultaneously reducing the assembling cost.

Where the plurality of coiled springs are used, the load to which an individual coiled spring is charged and its spring constant can be chosen separately, allowing an improved flexibility to be achieved in the choice of an input where the servo ratio changes and a range in which servo range can be changed subsequently in comparison to the prior art, by choosing a combination of parameters selected for individual coiled springs. Alternatively, where the urging member comprises a coiled wave spring, a greater range of load charged and spring constant selected is allowed in comparison to the use of the coiled springs or Belleville spring if a single spring is used, thus allowing the flexibility in the choice of an input where the servo ratio changes and a range in which the servo ratio can be changed subsequently to be improved in comparison to the prior art. In addition, the coiled wave spring exhibits a greater hysteresis as compared with coiled springs or a Belleville spring, allowing the controllability over a region of greater depression to be further improved.

According to the arrangement defined by the second aspect of the present invention, the base of the output shaft comprises a bottom which is integral with the rod member, and a cylindrical member which is separate from, but which is connected to the bottom. Accordingly, the machining cost as well as the assembling cost can be reduced in comparison to the prior art where the bottom and the cylindrical member are connected together by bolts to form the output shaft.

Where the urging member comprises the plurality of coiled springs, the loads charged and the spring constants of individual coiled springs can be chosen separately, allowing a greater flexibility to be provided in the choice of an input where the servo ratio changes and a range in which the servo ratio can be changed subsequently in comparison to the prior art, as a result of a combination of parameters which are selected for individual coiled springs. Where the urging member comprises a coiled wave spring, if a single spring is used, the load charged and the spring constant can be chosen from a greater range in comparison to the coiled springs or Belleville spring, thus allowing the flexibility in the choice of an input where the servo ratio changes and the range in which the servo ratio can be changed subsequently to be improved in comparison to the prior art. In addition, the coiled wave spring exhibits a greater hysteresis in comparison to the coiled springs and the Belleville spring, allowing the controllability in a region of greater depression to be improved.

With an arrangement defined by the third aspect of the present invention, the base of the output shaft comprises a bottom which is integrally connected to the rod member, and a cylinder in which the stop is disposed. Accordingly, the machining cost as well as the assembling cost can be simultaneously reduced in comparison to the prior art where the bottom and the cylinder are connected together by bolts to define the output shaft.

Where the urging member comprises a plurality of Belleville springs, the loads charged and spring constants of individual Belleville springs can be separately chosen, allowing the flexibility in the choice of an input where the servo ratio changes as well as the range in which the servo ratio can be changed subsequently to be improved in comparison to the prior art, by a combination of parameters which are chosen for individual Belleville springs. Alternatively, where the urging member comprises a diaphragm spring, the load charged and spring constant can be chosen in a greater range by changing a sheet thickness, a number of bulges or a configuration of the bulges. Accordingly, the flexibility in the choice of an input where the servo ratio changes as well as the range in which the servo ratio changes subsequently can be improved in comparison to the prior art.

Above and other objects, features and advantages of the present invention will become apparent from the following detailed description of several embodiments thereof with reference to the drawings.

DETAILED DESCRIPTION OF THE EMBODIMENTS

First Embodiment

Figure 1:
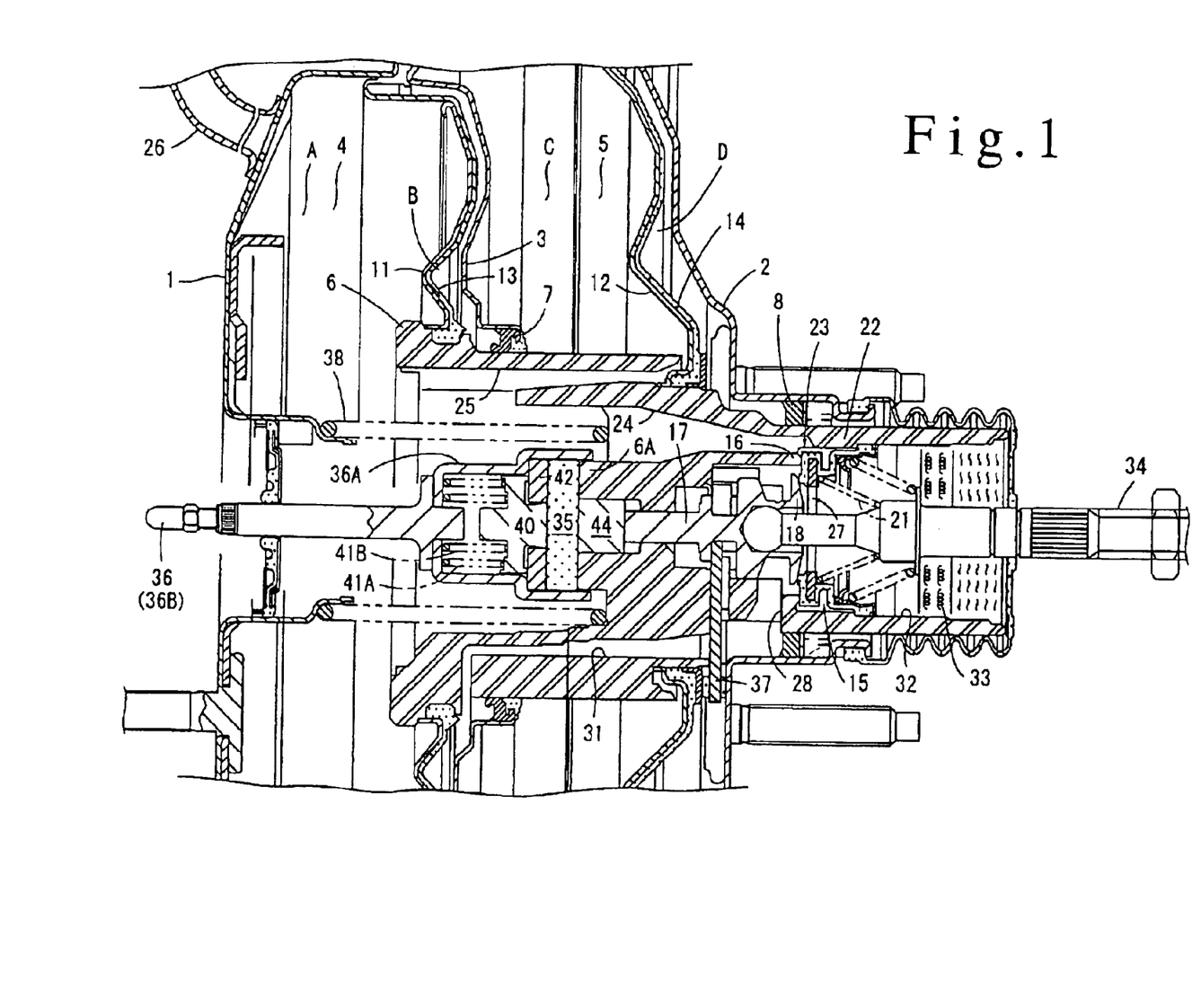
FIG. 1 is a cross section of a first embodiment of the present invention.

Referring to the drawings, several embodiments of the present invention will now be described. Referring to FIG. 1, an enclosed vessel is defined by a front shell 1 and a rear shell 2, and a centerplate 3 is disposed centrally therein to partition the interior of the vessel into a front chamber 4 and a rear chamber 5.

A substantially tubular valve body 6 slidably extends through the axial portions of the centerplate 3 and the rear shell 2 while maintaining a hermetic seal between the outer periphery of the valve body 6 and the centerplate 3 and the rear shell 2 with seal members 7 and 8, respectively.

A front power piston 11 and a rear power piston 12 which are received in the front chamber 4 and a rear chamber 5, respectively, are connected to the valve body 6, and a front diaphragm 13 and a rear diaphragm 14 are applied to the back surfaces of the power pistons 11 and 12, respectively, thereby defining a constant pressure chamber A and a variable pressure chamber B across the front diaphragm 13 and a constant pressure chamber C and a variable pressure chamber D across the rear diaphragm 14.

A valve mechanism 15 which switches flow paths between the pair of constant pressure chambers A, C and the pair of variable pressure chambers B, D and the atmosphere is disposed within the valve body 6. The valve mechanism 15 comprises an annular vacuum valve seat 16 formed on the inner periphery of the valve body 6, an annular atmosphere valve seat 18 formed on the right end of a valve plunger 17 which is slidably mounted on the valve body 6 at a location inward of the vacuum valve seat 16, and a valve element 22 which is adapted to be seated on both valve seats, 16, 18 under the resilience of spring 21.

A combination of the vacuum valve seat 16 and a seat area on the valve element 22 which moves into engagement therewith or disengagement therefrom defines a vacuum valve 23. A space located radially outward of the vacuum valve 23 communicates with the constant pressure chambers A, C through a first constant pressure passage 24 formed in the valve body 6 and a second constant pressure passage 25 formed outside the first constant pressure passage 24. The constant pressure chamber A communicates with an intake manifold of an engine, not shown, through a tube 26 which is provided in order to introduce a negative pressure.

On the other hand, a combination of the atmosphere valve seat 18 and a seat area on the valve element 22 which moves into engagement therewith or disengagement therefrom defines an atmosphere valve 27. A space located between the atmosphere valve 27 and the vacuum valve 23 communicates with the variable pressure chamber D through a radially extending, first variable pressure passage 28 formed in the valve body 6, and thence communicates with the variable pressure chamber B through a second variable pressure passage 31 formed to extend axially through the valve body 6. Finally, a space located radially inward of the atmosphere valve 27 communicates with the atmosphere through an atmosphere passage 32, in which a filter 33 is disposed.

A rear end of the valve plunger 17 is pivotally connected with a front end of an input shaft 34, the other end of which is connected to a brake pedal, not shown. On the other hand, a reaction disc 35, which is formed of rubber, is disposed forwardly of the valve plunger 17, and is received in a base 36A formed at the rear end of an output shaft 36. It is to be noted that the valve plunger 17 is engaged by a key member 37, thereby preventing the valve plunger 17 from being disengaged from the valve body 6.

The inner periphery of the valve body 6 is formed with an annular projection 6A which projects forwardly, and the base 36A, which is located at the rear end of the output shaft 36 and opens rearward, is slidably fitted around the outer periphery of the annular projection 6A. It will be noted that the reaction disc 35 in the base 36A is interposed between the bottom of the base 36A and the end face of the annular projection 6A.

At its front end, the output shaft 36 has a rod member 36B, which projects externally through the axial portion of the front shell 1 to be connected to the piston of a master cylinder, not shown.

A return spring 38 is disposed between the valve body 6 and the front shell 1, and accordingly, in the inoperative condition, the valve body 6 stays at rest in its inoperative position shown where the key member 37 abuts against the wall of the rear shell 2. Under this inoperative condition, the vacuum valve 23 is open, while the atmosphere valve 27 is closed. Accordingly, the constant pressure chambers A, C and the variable pressure chambers B, D communicate with each other, and the negative pressure is introduced in all of these chambers.

It is to be noted that a piston 40, which is arranged to be slidable in the axial direction and act as an abutment member which abuts against the reaction disc 35, is disposed within the base 36A of the output shaft 36, and stays at rest in its inoperative position shown where it engages a stop 42 as it is urged rearward by an outer coiled spring 41A of a smaller diameter and an inner coiled spring 41B of a larger diameter, which are disposed between the front end face of the piston 40 and a bottom of the base 36A and both acting as urging members. Under the inoperative condition, the outer coiled spring 41A and the inner coiled spring 41B are compressed between the piston 40 and the base 36A and charged to given loads. The stop 42 and the piston 40 in combination substantially form the bottom of the base 36A.

In the present embodiment, an arrangement is made so that the machining cost and the assembling cost of the base 36A of the output shaft 36 can be simultaneously reduced in comparison to a conventional booster and so that the flexibility in the choice of an input where the servo ratio of the booster changes and the range in which the servo ratio can be changed subsequently can be improved over the prior art.

Figure 2:
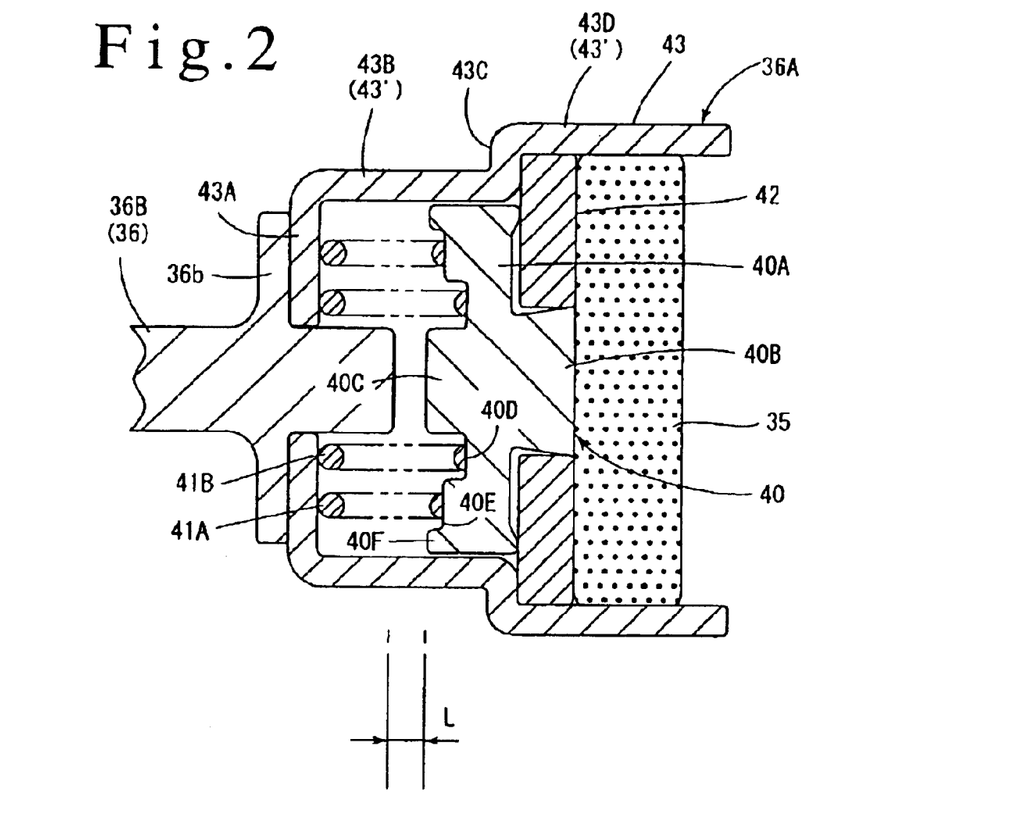
FIG. 2 is an enlarged view of an essential part shown in FIG. 1.

Specifically, as illustrated to an enlarged scale in FIG. 2, the base 36A of the output shaft 36 is formed by a holder 43 which is separate from the axially extending rod member 36B, and the stop 42 is separate from the holder 43. It is to be understood that the holder 43 is formed by a press operation in order to reduce the machining cost.

The holder 43 comprises a bottom 43A which extends radially inward from the periphery so that the rod member 36B is a press fit in the inner peripheral surface thereof and which has its front end face disposed in abutment against the rear end face of a flange 36b on the rod member 36B, a reduced diameter portion 43B which extends rearward from the outer periphery of the bottom 43A, a step 43C extending radially outward from the rear end of the reduced diameter portion 43B, and an increased diameter portion 43D extending rearward from the outer periphery of the step 43C. It will be noted that the reduced diameter portion 43B and the increased diameter portion 43D form together a cylindrical portion 43' of the holder 43. The outer coiled spring 41A is disposed forwardly within the reduced diameter portion 43B, and the inner coiled spring 41B is disposed inside the outer coiled spring 41A and the piston 40 is disposed rearward of both coiled springs.

The piston 40 comprises a body 40A having a diameter less than the diameter of the inner peripheral surface of the reduced portion 43B of the stepped holder 43, a rear projection 40B projecting rearward from the rear end face of the body 40A and slidably fitted into the inner peripheral surface of the stop member 42, and a front projection 40C extending forwardly from the front end face of the body 40A and having its front end face disposed in opposing relationship with the rear end face of the rod member 36B with a clearance L therebetween.

The axial size of the rear projection 40B is chosen such that the rear projection 40B is flush with the rear end face of the stop 42 when the rear end face of the body 40A abuts against the front end face of the stop 42, the rear end face of the rear projection 40B substantially representing the rear end face of the piston 40. It is to be noted that the axial size of the stop 42 and the axial size of the rear projection 40B are chosen to be greater than the clearance L so that a fitting engagement between the stop 40 and the rear projection 40B is maintained.

It will be noted that the front end face of the body 40A of the piston 40 is formed with an inner annular step 40D which is disposed outside the front projection 40C so as to be abutted by the rear end face of the inner coiled spring 41B, an outer annular step 40E disposed radially outward of the inner annular step 40D and extending forwardly so as to restrict a radially outward movement of the inner coiled spring 41B and adapted to be abutted by the rear end of the outer coiled spring 41A, and a fold 40F disposed outside the outer annular step 40E and projecting forward so as to restrict a radial movement of the outer coiled spring 41A. In this manner, an interference between the outer coiled spring 41A and the inner coiled spring 41B which are concentrically disposed can be prevented.

The outer coiled spring 41A and the inner coiled spring 41B which are disposed inside the reduced diameter portion 43B are charged to given loads when the rear end face of the body 40A of the piston 40 abuts against the stop 42.

The stop 42 is in the form of a ring having a rectangular cross section, and has an external diameter measured at its outer periphery which is substantially equal to the internal diameter of the increased diameter portion 43D, and an internal diameter measured at its inner periphery which is less than the internal diameter of the reduced diameter portion 43B. In this manner, the stop 42 can be disposed as a press fit into the stepped holder 43 while its outer periphery is maintained pressed against the inner periphery of the increased diameter portion 43D, and is secured in position so that the front end face thereof abuts against the rear end face of the step 43C. It will be noted that the reaction disc 35 is disposed in abutment against the rear end face of the stop 42. In this manner, the base 36A is assembled as shown.

Alternatively, the coiled springs 41A, 41B, the piston 40, the stop 42 and the reaction disc 35 may be assembled with the stepped holder 43 before the stepped holder 43 is connected with the rod member 36B.

Operation

With the described booster, when a brake pedal, not shown, is depressed under the inoperative condition shown in FIGS. 1 and 2 to drive the input shaft 34 and its connected valve plunger 17 forward, the vacuum valve 23 is closed while the atmosphere valve 27 is opened. The atmosphere is then introduced into the variable pressure chambers B, D, and a pressure differential between the negative pressure in the constant pressure chambers A, C and the atmospheric pressure in the variable pressure chambers B, D drives the valve body 6 and the output shaft 36 forward, thus actuating the brake booster.

When the brake booster is actuated in this manner, a reaction from the output acting upon the output shaft 36 compresses the reaction disc 35 in the axial direction, whereby the rear end face of the reaction disc bulges rearward to cause the plunger 44 to abut against the front end face of the valve plunger 17. During the initial phase of operation of the brake booster, a force of depression (input) applied to the brake pedal is small, and accordingly, the force acting from the reaction disc 35 to the piston is less than a sum of the loads to which the both coiled springs 41A, 41B are charged, and the piston 40 thus remains in abutment against the stop 42.

Figure 3:
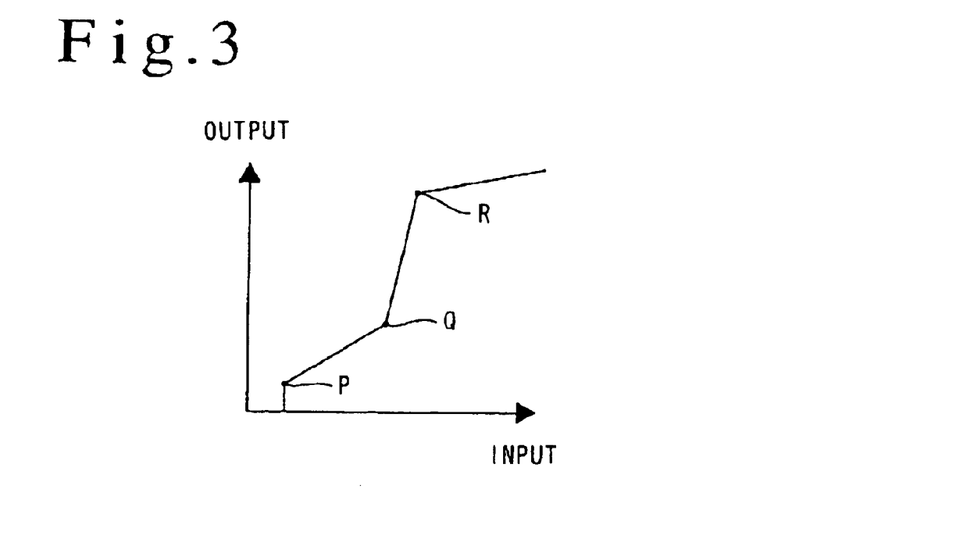
FIG. 3 graphically shows a relationship between the input and the output of a brake booster shown in FIG. 1.

As a consequence, subsequent to a jumping point P shown in FIG. 3 where the reaction disc 35 is brought into abutment against the front end face of the valve plunger 17 through the plunger 44 in the manner mentioned above, the output rises with a given servo ratio which is determined by the cross-sectional area of the plunger 44 and the cross-sectional area of the annular projection 6A on the valve body 6 which is abutted by the reaction disc 35.

After the actuation of the brake booster, when the force of depression (input) applied to the brake pedal increases and the force acting from the reaction disc 35 to the piston 40 forwardly exceeds the sum of loads to which the coiled springs 41A, 41B are charged, the piston 40 begins to move forward against the resilience of both coiled springs 41A, 41B (point Q shown in FIG. 3). This movement causes part of the reaction disc 35 to bulge into the stop 42, and accordingly, a rise in the internal pressure of the reaction disc 35 becomes more gentle by a corresponding amount in comparison to the rise which occurs before. As a result, the output rises with a greater servo ratio subsequent to the point Q as compared with the servo ratio which prevailed between the points P and Q. Subsequently, upon full load (at and after the point R in FIG. 3), the output rises with a ratio of 1:1 with respect to the input as is well known in the art.

Accordingly, it will be seen that the present embodiment is constructed such that when the force of depression (input) applied to the brake pedal exceeds a given value (an input corresponding to point Q in FIG. 3), the servo ratio is switched to a greater servo ratio than before. This allows an output of an increased magnitude to be reliably obtained in response to an input of a small magnitude even for an underpowered driver such as a woman, in an emergency braking which requires a braking effort of an increased magnitude, thus improving the safety during an emergency.

During the initial phase of operation which occurs immediately after actuating the brake booster 1, as indicated by a region located between points P and Q in FIG. 3, which occurs when actuating the brake booster while a vehicle is running at a low or medium speed, the output rises with a servo ratio which is similar to that occurring in a conventional brake booster, and thus a brake feeling experienced by the driver cannot be degraded when the vehicle is running at a low or medium speed.

In the present embodiment, the base 36A of the output shaft 36 can, be constructed without using bolts, which causes an increased machining cost, and thus the machining cost can be reduced in comparison to the use of such bolts. In addition, the stepped holder 43 and the stop 42 can be assembled by a press fit operation, thus reducing the assembling cost in comparison to the use of bolts. In addition, in the present embodiment, the stop 42 is separate from the stepped holder 43, which can be formed by an inexpensive press operation, allowing the machining cost to be further reduced.

In the present embodiment, the piston 40 is urged rearward by the pair of the outer coiled spring 41A and the inner coiled spring 41B. This allows the flexibility in the choice of the input where the servo ratio of the brake booster changes as well as the range in which the servo ratio can be subsequently changed to be improved in comparison to the prior art, by choosing separate charged loads and spring constants for the respective springs.

Although two coiled springs 41A, 41B are used as an urging member in the present embodiment, three or more coiled springs may be used. This further increases the flexibility in the choice of the input where the servo ratio changes as well as the range in which the servo ratio can be changed subsequently.

Second Embodiment

Figure 4:
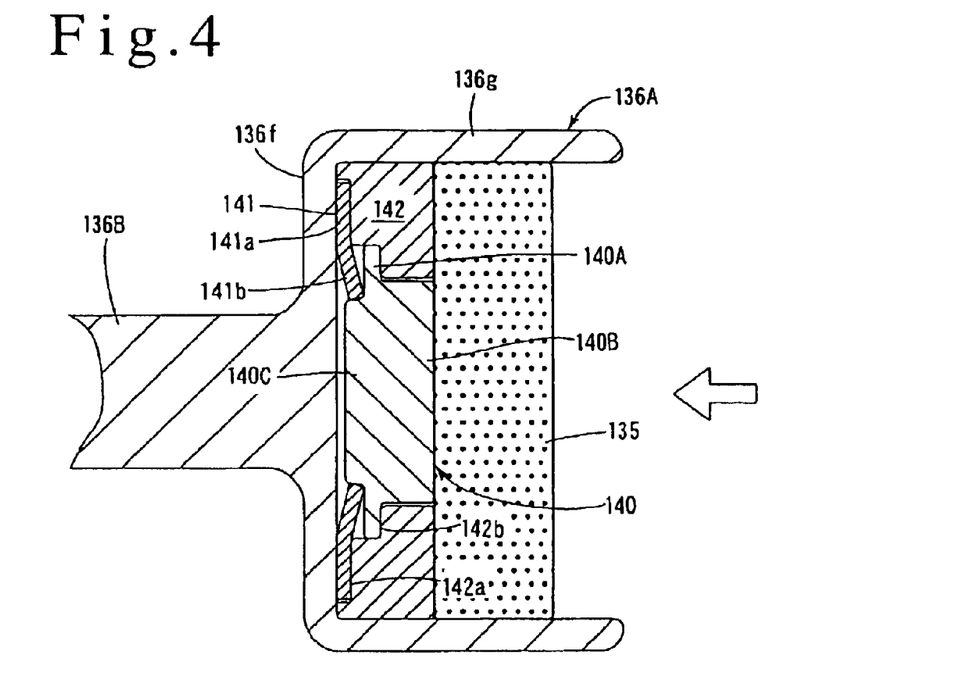
FIG. 4 is a cross section of a second embodiment of the present invention.
Figure 5:
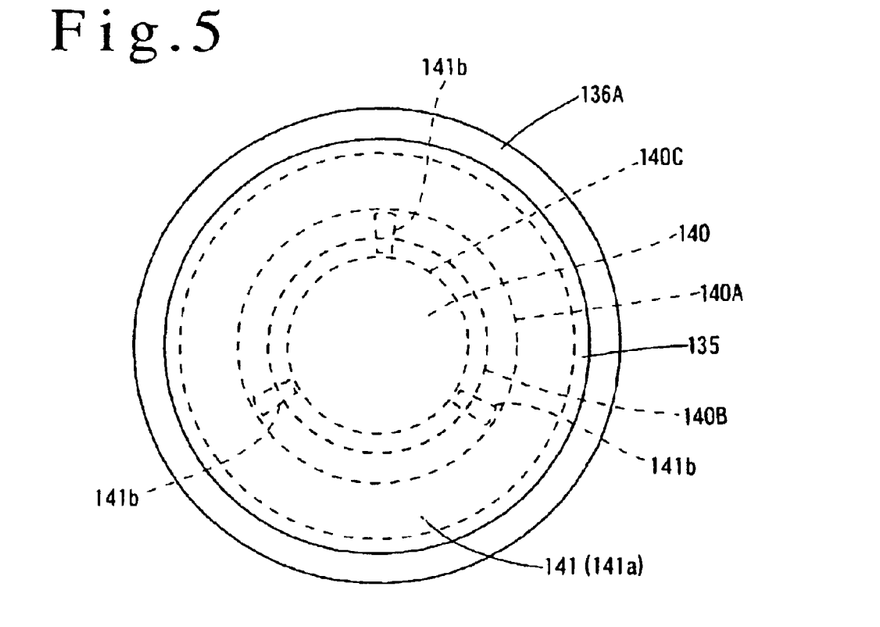
FIG. 5 is a rear view, as viewed in a direction indicated by an arrow shown in FIG. 2.

FIGS. 4 and 5 shows a second embodiment of the invention. In the first embodiment mentioned above, the base 36A (holder 43) and the rod member 36B were separate from each other. However, in the second embodiment, a base 136A and a rod member 136B are formed integrally. The base 136A comprises a bottom 136f extending radially outward from the rear end of the rod member 136B, and a cylinder 136g extending rearward from the outer periphery of the bottom 136f.

In the second embodiment, concomitant with the modification of the base 136A, the coiled springs 41A, 41B, having increased axial sizes, are replaced by a single diaphragm spring 141 having a reduced axial size, and the axial size of a front projection 140C, in particular, is reduced in a manner corresponding to the reduced axial size of the diaphragm spring 141. The diaphragm spring 141 comprises a body 141a in the form of a flat plate and a plurality of bulges 141b bulging axially rearward from the body 141a at a plurality of circumferentially equally spaced points for abutment against the piston 140.

On its front end face, a stop 142 comprises an outer step 142a which receives the body 141a of the diaphragm spring 141, and an inner step 142b which is concentric with the outer step 142a and which receives the bulges 141b and the body 140a of the piston 140. When not actuated, the body 140A abuts against the inner step 142b by means of the bulges 141b.

In other respects, the arrangement is similar to corresponding parts shown in the first embodiment (except for diaphragm spring 141), and accordingly, parts corresponding to those shown in the first embodiment are designated by like reference numerals as used in the first embodiment, to which 100 is added.

It will be seen from the foregoing that the second embodiment is capable of achieving a similar result as achieved in the first embodiment with respect to the base 136A. In addition, because the base 136A and the rod member 136B can be molded integrally, the machining cost and the assembling cost can be further reduced.

In this embodiment, by changing the sheet thickness of the diaphragm spring 141 or the number or the configuration of the bulges 141b, the charged loads and the spring constants can be changed, thus allowing flexibility in the choice of the input where the servo ratio of the brake booster changes and the range in which the servo ratio can be changed subsequently to be improved in comparison to the prior art, in the similar manner as mentioned above in connection with the first embodiment.

The diaphragm spring 141 used in the present embodiment may be replaced by a Belleville spring. Where Belleville springs are used, a plurality of Belleville springs having different responses may be axially superimposed one above another in order to change the charged loads and the spring constants.

Third Embodiment

Figure 6:
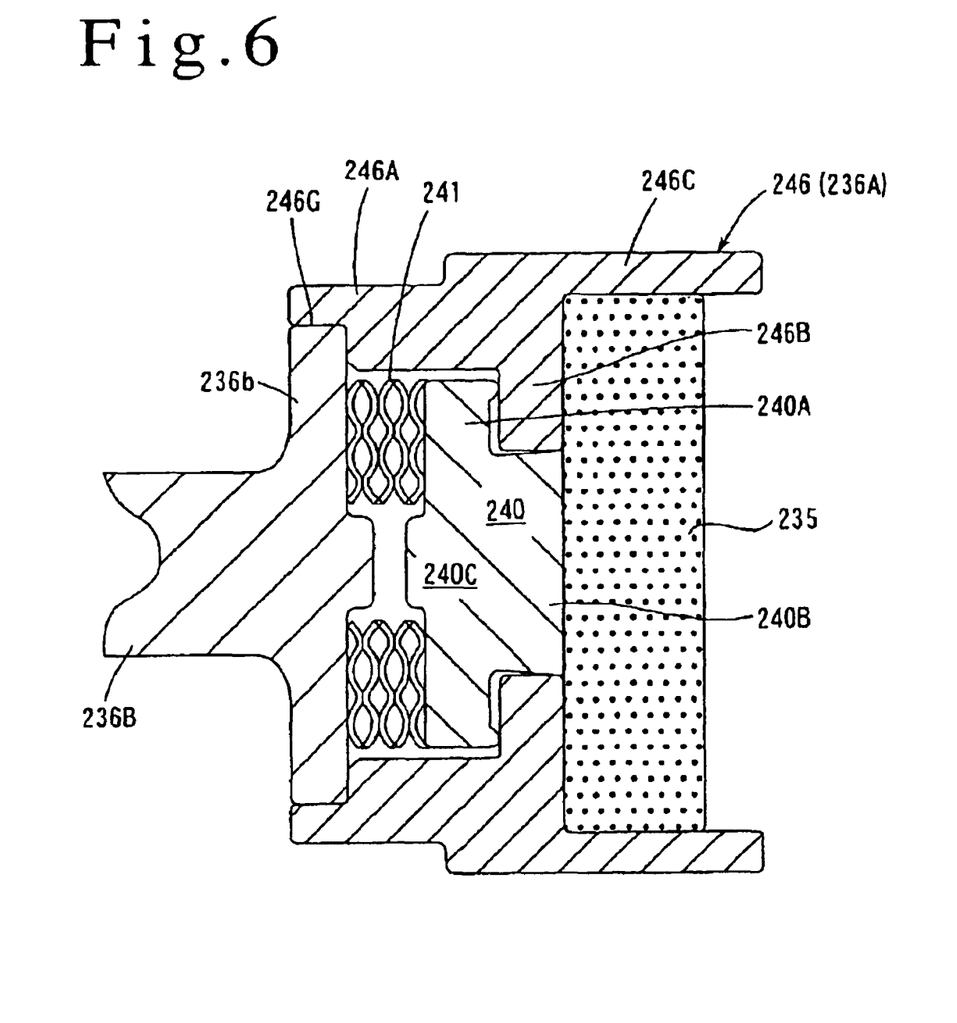
FIG. 6 is a cross section of a third embodiment of the present invention.

FIG. 6 shows a third embodiment of the present invention. As mentioned previously, in the first embodiment, the base 36A of the output shaft 36 is formed by the holder 43 and the stop 42 which is separate from the holder. However, in the third embodiment, the base comprises a bottom 236b formed at the rear end of a rod member 236B, and a cylindrical member 246 connected to the bottom 236b and extending rearward.

Specifically, the cylindrical member 246 comprises a reduced diameter portion 246A connected to the outer periphery of the bottom 236b and extending rearward, a stop 246B extending radially inward from the rear end of the reduced diameter portion 246A, and an increased diameter portion 246C of a reduced thickness which extends rearward from the rear end of the stop 246B at its outer periphery. The front end of the reduced diameter portion 246A is formed with a notch 246G around the inner periphery thereof to a diameter which is equal to the outer periphery of the bottom 236b. By disposing the bottom 236b as a press fit in the notch 246G, the cylindrical member 246 is integrally connected with the rod member 236B.

In the present embodiment, a piston 240 is disposed rearward within the reduced diameter portion 246A, and a single coiled wave spring 241 is disposed forwardly of the piston. When the piston 240 and the coiled wave spring 241 are assembled together, the notch 246G in the cylindrical member 246 is disposed as a press fit around the bottom 236b of the rod member 236B, and subsequently, a reaction disc 235 is inserted into the increased diameter portion 260C and positioned so that its front end face abuts against the rear end face of the stop 246B. In this manner, the cylindrical member 246A (base 236A) is assembled in the manner shown.

In other respects, the arrangement is similar as in the first embodiment (except for the coiled wave spring 241) and accordingly, corresponding parts to those shown in the first embodiment are designated by like reference numerals as used in the first embodiment, to which 200 is added.

In the present embodiment, a similar effect as achieved in the first embodiment can be obtained with respect to the cylindrical member 246 (base 236A).

As mentioned above, the coiled wave spring 241 is used as an urging member and, if a single coiled wave spring 241 is used, the charged load and the spring constant can be chosen from a greater range than for a single coiled spring or Belleville spring, and accordingly, the flexibility in the choice of the input where the servo ratio of the brake booster changes and the range in which the servo ratio can be changed subsequently can be improved in comparison to the prior art. In addition, the coiled wave spring 241 exhibits a hysteresis an that an input upon depression and an input upon release, which prevail for an equal output, differ from each other as a result of a friction occurring between coil elements during the deformation. Accordingly, when the input increases in magnitude and after the piston 240 begins to be moved forward against the resilience of the coiled wave spring 241, the hysteresis which the spring 241 exhibits is added to the hysteresis of the reaction disc 235, allowing the controllability in a region of a greater depression of the brake pedal to be further improved.

In the first embodiment, the coiled springs 41A and 41B have been used as urging members, but the coiled wave spring may be used as well. Alternatively, the coil wave spring 241 used as the urging member in the third embodiment may be replaced by a plurality of coiled springs.

While the invention has been described above in connection with several embodiments thereof, it should be understood that a number of changes, modifications and substitutions therein are possible from the above disclosure without departing from the spirit and the scope of the invention defined by the appended claims.

What is claimed is:

1. A booster comprising a valve body slidably disposed within a shell, a valve plunger slidably fitted over the valve body and mechanically coupled to an input shaft, an output shaft having a closed-end cylindrical base which opens rearwardly and is slidably mounted on the valve body, an annular stop fixed to a predetermined position in an axial direction in the base, a reaction disc disposed between a rear end face of the annular stop in the base of the output shaft and a front end face of the valve plunger, an abutment member movably disposed in the base at a position closer to the front of the base than the stop and having a rear projection slidably fitted in the stop and an urging member disposed in the base at a position closer to the front of the base than the stop for abutting a rear end face of the rear projection to a front end face of the reaction disc by urging the abutment member towards the rear, the urging means being compressed after actuation of the booster and the rear projection of the abutment member moves toward the front of the base by a corresponding amount with respect to the stop to allow the reaction disc to bulge into the stop and increase the servo ratio, the base of the output shaft being formed by a holder which is separate from an axially extending rod member, the stop being separate from the holder, the holder being in the form of a bottomed cylinder having a bottom which is secured to the rod member, the stop being secured inside the cylinder, the abutment member and the urging member being disposed between the stop and the bottom and the urging member comprising either a plurality of concentrically disposed coiled springs or a single coiled wave spring.

2. The booster according to claim 1, wherein the urging member comprises an inner coiled spring and an outer coiled spring which are concentrically disposed, an inner annular step and an outer annular step are formed on a front end face of the abutment member, a rear end portion of the inner coiled spring abuts against the inner annular step and a rear end portion of the outer coiled spring abuts against the outer annular step, thereby preventing the coiled springs from interfering with each other.

3. A booster comprising a valve body slidably disposed within a shell, a valve plunger slidably fitted over the valve body and mechanically coupled to an input shaft, an output shaft having a closed-end cylindrical base which opens rearwardly and is slidably mounted on the valve body, an annular stop fixed to a predetermined position in an axial direction in the base, a reaction disc disposed between a rear end face of the annular stop in the base of the output shaft and a front end face of the valve plunger, an abutment member movably disposed in the base at a position closer to the front of the base than the stop and having a rear projection slidably fitted in the stop and an urging member disposed in the base at a position closer to the front of the base than the stop for abutting a rear end face of the rear projection to a front end face of the reaction disc by urging the abutment member towards the rear, the urging means being compressed after actuation of the booster and the rear projection of the abutment member moves toward the front of the base by a corresponding amount with respect to the stop to allow the reaction disc to bulge into the stop and increase the servo ratio, the base of said output shaft comprising a bottom which is integral with an axially extending rod member and connected to the rear end of the rod member and a cylindrical member which is separate from but connected to the bottom, the stop being formed integrally with the base and on the inner periphery of the cylindrical member, the abutment member and the urging member being disposed between the stop and the bottom and the urging member comprising either a plurality of concentrically disposed coil springs or a single coiled wave spring.

4. A booster comprising a valve body slidably disposed within a shell, a valve plunger slidably fitted over the valve body and mechanically coupled to an input shaft, an output shaft having a closed-end cylindrical base which opens rearwardly and is slidably mounted on the valve body, an annular stop fixed to a predetermined position in an axial direction in the base, a reaction disc disposed between a rear end face of the annular stop in the base of the output shaft and a front end face of the valve plunger, an abutment member movably disposed in the base at a position closer to the front of the base than the stop for abutting a rear end face of the rear projection to a front end face of the reaction disc by urging the abutment member towards the rear, the urging means being compressed after actuation of the booster and the rear projection of the abutment member moves toward the front of the base by a corresponding amount with respect to the stop to allow the reaction disc to bulge into the stop and increase the servo ratio, the base of the output shaft comprising a bottom which is integral with an axially extending rod member and connected to the rear end of the rod member and a cylinder connected to the bottom, the stop being separate from the base and comprising a body which abuts against the front end face of the reaction disc and the cylinder, the abutment member and the urging member being disposed between the body and the bottom and the urging member comprising either a plurality of Belleville springs or a single diaphragm spring.

* * * * *